(12) United States Patent
Manson

(10) Patent No.: US 6,735,516 B1
(45) Date of Patent: May 11, 2004

(54) METHODS AND APPARATUS FOR TELEPHONING A DESTINATION IN VEHICLE NAVIGATION

(75) Inventor: William R. Manson, Aptos, CA (US)

(73) Assignee: Horizon Navigation, Inc., Santa Clara, CA (US)

(*) Notice: Subject to any disclaimer, the term of this patent is extended or adjusted under 35 U.S.C. 154(b) by 0 days.

(21) Appl. No.: 09/656,552

(22) Filed: Sep. 6, 2000

(51) Int. Cl.$^7$ .................. G01C 21/00; G08G 1/0969
(52) U.S. Cl. .................. 701/209; 701/201; 701/207; 340/995.1; 359/142; 369/50; 455/456.1; 455/460
(58) Field of Search ................ 701/209, 210, 701/208, 201, 207, 212, 211; 340/995.1, 988, 990, 994, 991, 905; 359/142; 369/50; 455/435, 456.1, 460

(56) References Cited

U.S. PATENT DOCUMENTS

| | | | |
|---|---|---|---|
| 3,845,289 A | 10/1974 | French | 235/151.2 |
| 4,570,227 A | 2/1986 | Tachi et al. | 364/444 |
| 4,608,656 A | 8/1986 | Tanaka et al. | 364/449 |
| 4,611,293 A | 9/1986 | Hatch et al. | 364/571 |
| 4,672,565 A | 6/1987 | Kuno et al. | 364/571 |
| 4,673,878 A | 6/1987 | Tsushima et al. | 324/226 |
| 4,723,218 A | 2/1988 | Hasebe et al. | 364/449 |
| 4,734,863 A | 3/1988 | Honey et al. | 364/449 |
| 4,751,512 A | 6/1988 | Longaker | 342/357 |
| 4,782,447 A | 11/1988 | Ueno et al. | 364/449 |
| 4,796,191 A | 1/1989 | Honey et al. | 364/450 |
| 4,797,841 A | 1/1989 | Hatch | 364/571.04 |
| 4,831,563 A | 5/1989 | Ando et al. | 364/571.05 |
| 4,862,390 A | 8/1989 | Weiner | 395/352 |
| 4,862,398 A | 8/1989 | Shimizu et al. | 364/571.05 |
| 4,914,605 A | 4/1990 | Loughmiller, Jr. et al. | 364/518 |
| 4,918,609 A | 4/1990 | Yamawaki | 364/449 |
| 4,926,336 A | 5/1990 | Yamada | 364/444 |
| 4,937,753 A | 6/1990 | Yamada | 364/449 |
| 4,964,052 A | 10/1990 | Ohe | 364/449 |
| 4,970,652 A | 11/1990 | Nagashima | 364/449 |
| 4,982,332 A | 1/1991 | Saito et al. | 364/449 |
| 4,984,168 A | 1/1991 | Neukrichner et al. | 364/449 |
| 4,989,151 A | 1/1991 | Nuimura | 364/449 |
| 4,992,947 A | 2/1991 | Nimura et al. | 364/444 |
| 4,996,645 A | 2/1991 | Schneyderberg Van DerZon | 364/449 |

(List continued on next page.)

FOREIGN PATENT DOCUMENTS

| | | | |
|---|---|---|---|
| DK | 19901603 A | 12/1999 | G01C/21/00 |
| EP | 0 485 120 A2 | 5/1992 | |
| EP | 0 575 943 1 | 12/1993 | |
| EP | 08180295 | 12/1996 | G08G/1/0962 |
| EP | 09113288 | 2/1997 | G01C/21/00 |
| EP | 11142174 | 5/1999 | G01C/21/00 |
| GB | 2 271 423 A | 4/1994 | |
| JP | 09-113288 | * 5/1997 | |

OTHER PUBLICATIONS

French, *MAP matching Origins Approaches and Applications*, Rober L. French & Associates, 3815 Lisbon St., Suite 201, Fort Worth, Texas 76107, USA, pps. 91–116, no date.

Primary Examiner—Thomas G. Black
Assistant Examiner—Tuan L To
(74) Attorney, Agent, or Firm—Beyer Weaver & Thomas, LLP (57) ABSTRACT

The present invention provides a computer implemented method for dialing a telephone number using a vehicle navigation system in the following manner. A destination is retrieved in response to selection of the destination by the user. A determination is then made if there is a phone number associated with the destination. Where there is a phone number associated with the destination, a phone number is transmitted to a wireless communications device for dialing.

26 Claims, 5 Drawing Sheets

U.S. PATENT DOCUMENTS

| | | | |
|---|---|---|---|
| 4,999,783 A | 3/1991 | Tenmoku et al. | 364/450 |
| 5,040,122 A | 8/1991 | Neukirchner et al. | 364/449 |
| 5,046,011 A | 9/1991 | Kakihara et al. | 364/449 |
| 5,059,965 A | 10/1991 | Geiser | 340/995 |
| 5,060,162 A | 10/1991 | Ueyama et al. | 364/449 |
| 5,072,395 A | 12/1991 | Bliss et al. | 364/443 |
| 5,115,399 A | 5/1992 | Nimura et al. | 364/449 |
| 5,177,685 A | 1/1993 | Davis et al. | 364/443 |
| 5,191,532 A | 3/1993 | Moroto et al. | 364/449 |
| 5,272,638 A | 12/1993 | Martin et al. | 364/444 |
| 5,283,743 A | 2/1994 | Odagawa | 364/457 |
| 5,287,297 A | 2/1994 | Ihara et al. | 364/571.02 |
| 5,297,050 A | 3/1994 | Ichimura et al. | 364/444 |
| 5,297,051 A | 3/1994 | Arakawa et al. | 364/449 |
| 5,369,588 A | 11/1994 | Hayami et al. | 364/449 |
| 5,371,497 A | 12/1994 | Nimura et al. | 340/995 |
| 5,410,485 A | 4/1995 | Ichikawa | 364/444 |
| 5,412,573 A | 5/1995 | Barnea et al. | 364/449 |
| 5,442,557 A | 8/1995 | Kaneko | 364/449 |
| 5,448,485 A | 9/1995 | Ishibashi et al. | 364/443 |
| 5,463,554 A | 10/1995 | Araki et al. | 364/444 |
| 5,486,822 A | 1/1996 | Tenmoku et al. | 340/995 |
| 5,506,774 A | 4/1996 | Nobe et al. | 364/424.05 |
| 5,513,110 A | 4/1996 | Fujita et al. | 364/449 |
| 5,519,619 A | 5/1996 | Seda | 364/444 |
| 5,521,826 A | 5/1996 | Matsumoto | 364/449 |
| 5,546,310 A | 8/1996 | Ehdaie et al. | 364/449 |
| 5,646,856 A | 7/1997 | Kaesser | 364/449.4 |
| 5,654,908 A | 8/1997 | Yokoyama | 364/705.05 |
| 5,680,312 A | 10/1997 | Oshizawa et al. | 364/444.2 |
| 5,689,252 A | 11/1997 | Ayanoglu et al. | 340/991 |
| 5,691,743 A | 11/1997 | Kusano | 345/123 |
| 5,712,788 A | 1/1998 | Liaw et al. | 364/449 |
| 5,721,684 A | 2/1998 | Takita | 364/443 |
| 5,724,316 A | 3/1998 | Brunts | 368/10 |
| 5,731,979 A | 3/1998 | Yano et al. | 364/449.5 |
| 5,875,412 A | 2/1999 | Sulich et al. | 701/207 |
| 5,926,118 A * | 7/1999 | Hayashida et al. | 340/995 |
| 5,941,930 A * | 8/1999 | Morimoto et al. | 701/201 |
| 5,941,933 A | 8/1999 | Miysake et al. | 701/208 |
| 6,049,755 A * | 4/2000 | Lou et al. | 701/207 |
| 6,088,649 A | 7/2000 | Kadaba et al. | 701/201 |
| 6,163,749 A * | 12/2000 | McDonough et al. | 701/208 |
| 6,266,614 B1 * | 7/2001 | Alumbaugh | 701/211 |
| 6,317,684 B1 * | 11/2001 | Roeseler et al. | 701/202 |
| 6,336,074 B1 * | 1/2002 | Woo | 701/208 |
| 6,385,465 B1 * | 5/2002 | Yoshioka | 455/564 |
| 6,430,411 B1 * | 8/2002 | Lempio et al. | 455/432 |

* cited by examiner

METHODS AND APPARATUS FOR TELEPHONING A DESTINATION IN VEHICLE NAVIGATION

BACKGROUND OF THE INVENTION

The present invention relates to automatic phone dialing using vehicle navigation system resources. More specifically, the invention provides various methods and apparatus for automatic dialing of phone numbers associated with destinations entered in a vehicle navigation system or addresses entered in a personal digital assistant ("pda") or other personal address book.

Vehicle navigation systems have become more prevalent in recent times. While vehicle navigation systems have greatly aided in generating the most efficient routing to a destination, unforeseen circumstances such as construction zones, detours, traffic accidents, and traffic congestion often result in travel delays. Many times it is necessary to contact an individual at the destination to advise them of the delay in expected arrival time. Alternately it is often desired to initiate a telephone conversation with individuals at intermediate destinations or with individuals at other destinations or even individuals listed in a personal address book. Vehicles are now commonly equipped with wireless phone capabilities, either in the form of a built in wireless system or through a portable wireless phone carried by one or more occupants.

Presently there is no way to integrate the vehicle navigation system functions with the dialing of the wireless telephone. Contacting a destination requires the phone number to be known to the vehicle occupants, obtained from directory assistance, or obtained manually from other printed or electronic sources. Examples include a printed telephone book, a personal printed address book, a personal digital assistant, or a laptop computer. These methods require significant time and effort in locating the phone numbers. They are especially problematic where the driver is the sole occupant of the vehicle and must either stop the vehicle to look up the phone number or risk impairing his concentration while driving to complete these tasks. What is needed is a device or method which will allow the user to automatically obtain and dial a phone number associated with a destination or address book entry without pulling the vehicle off of the roadway or otherwise interfering with the driving effort.

SUMMARY OF THE INVENTION

The present invention provides methods and apparatus for automatically obtaining a telephone number from electronic directories associated with or connected to a vehicle navigation system and transmitting those to a wireless communications device for dialing. In one method of the present invention, a user selects a destination for entry into a vehicle navigation system. The method retrieves the destination from the map database associated, with the vehicle navigation system and determines if there is a phone number associated with that destination. Where the phone number exists, the user is notified by a text message appearing on the display for the vehicle navigation system and given the option of dialing the number. The user selects the dialing option by depressing a soft key associated with that notification. Following selection, the phone number is transmitted to the wireless communications device (typically a telephone) for dialing. In an alternate embodiment, the destination is retrieved from a user's address book and associated memory is concurrently searched for a phone number for that destination.

The present invention provides computer implemented methods and apparatus for dialing a telephone number using a vehicle navigation system in the following manner. A destination is retrieved in response to selection of the destination by the user. A determination is then made if there is a phone number associated with the destination. Where there is a phone number associated with the destination, a phone number is transmitted to a wireless communications device for dialing.

In another specific embodiment, where there is a phone number associated with the destination, an option for dialing the phone number is communicated to the user. In response to selection of the option by the user, a phone number is transmitted to a wireless communications device for dialing. In another specific embodiment, the destination is stored in a map database associated with the vehicle navigation system. Determining if there is a phone number involves determining if there is a phone number associated with the destination in the map database. In yet another embodiment, the destination is stored in an address book associated with the user, and determining if there is a phone number involves determining if there is a phone number associated with the destination in the address book. In yet another embodiment, the wireless communications device is integral to the vehicle navigation system. According to yet another embodiment, the wireless communications device is separate from the vehicle navigation system.

These and other aspects of the invention can be further understood by reading the detailed description and reviewing the attached drawings.

DETAILED DESCRIPTION OF SPECIFIC EMBODIMENTS

Figure 1:
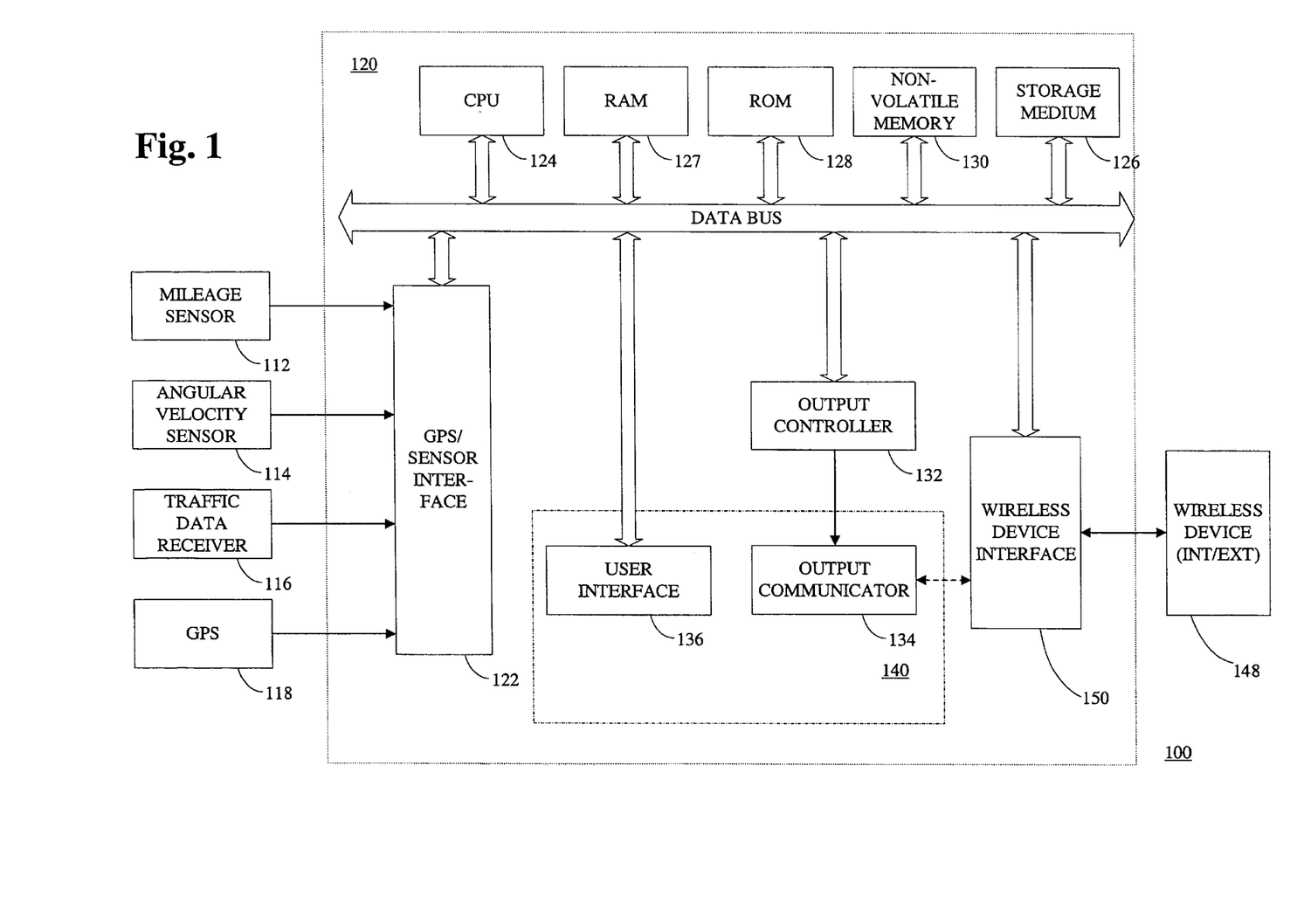
FIG. 1 is a block diagram of a vehicle navigation system and a wireless communications interface for use with the present invention.
Figure 4A:
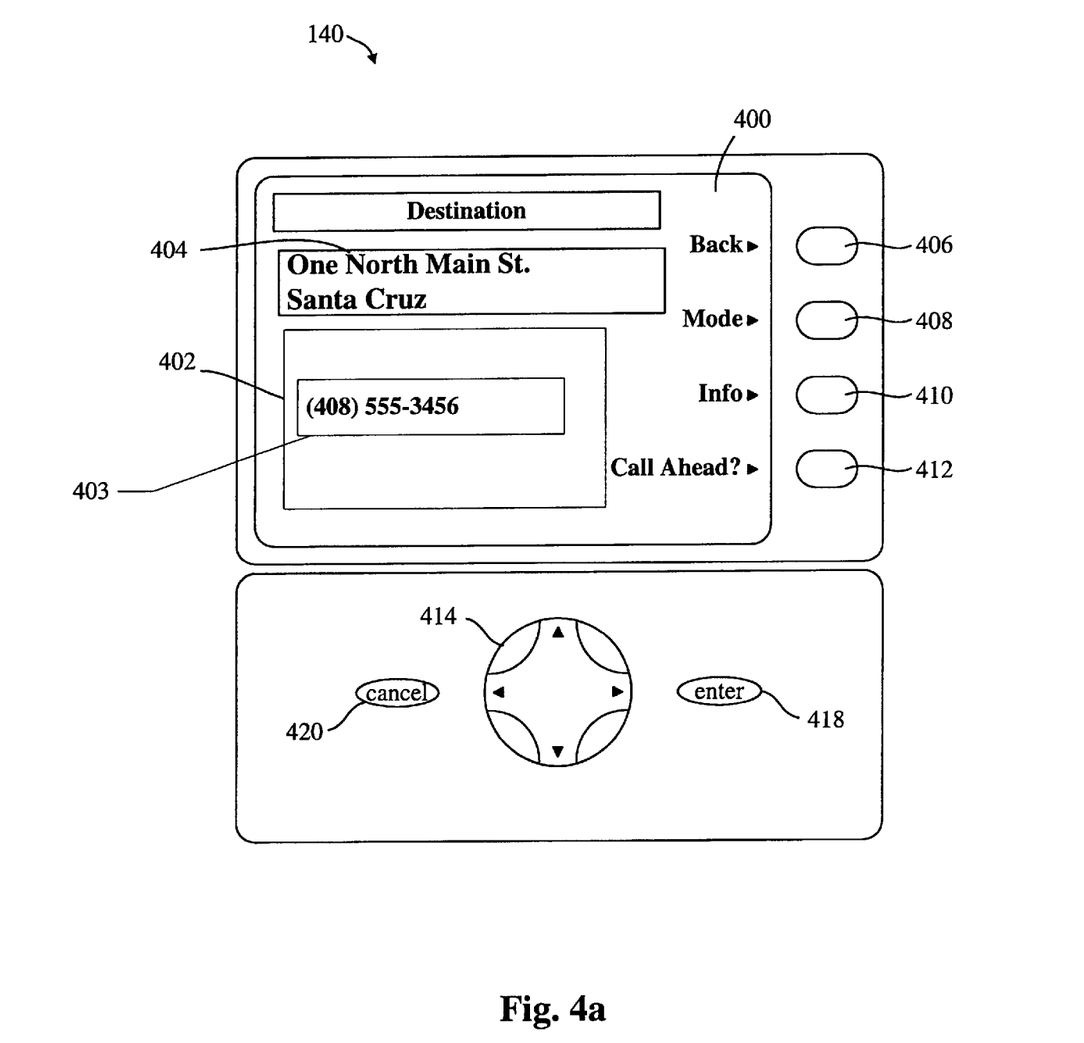
FIG. 4a illustrates a sample GUI screen with a soft key device for selecting a dialing option.
Figure 4B:
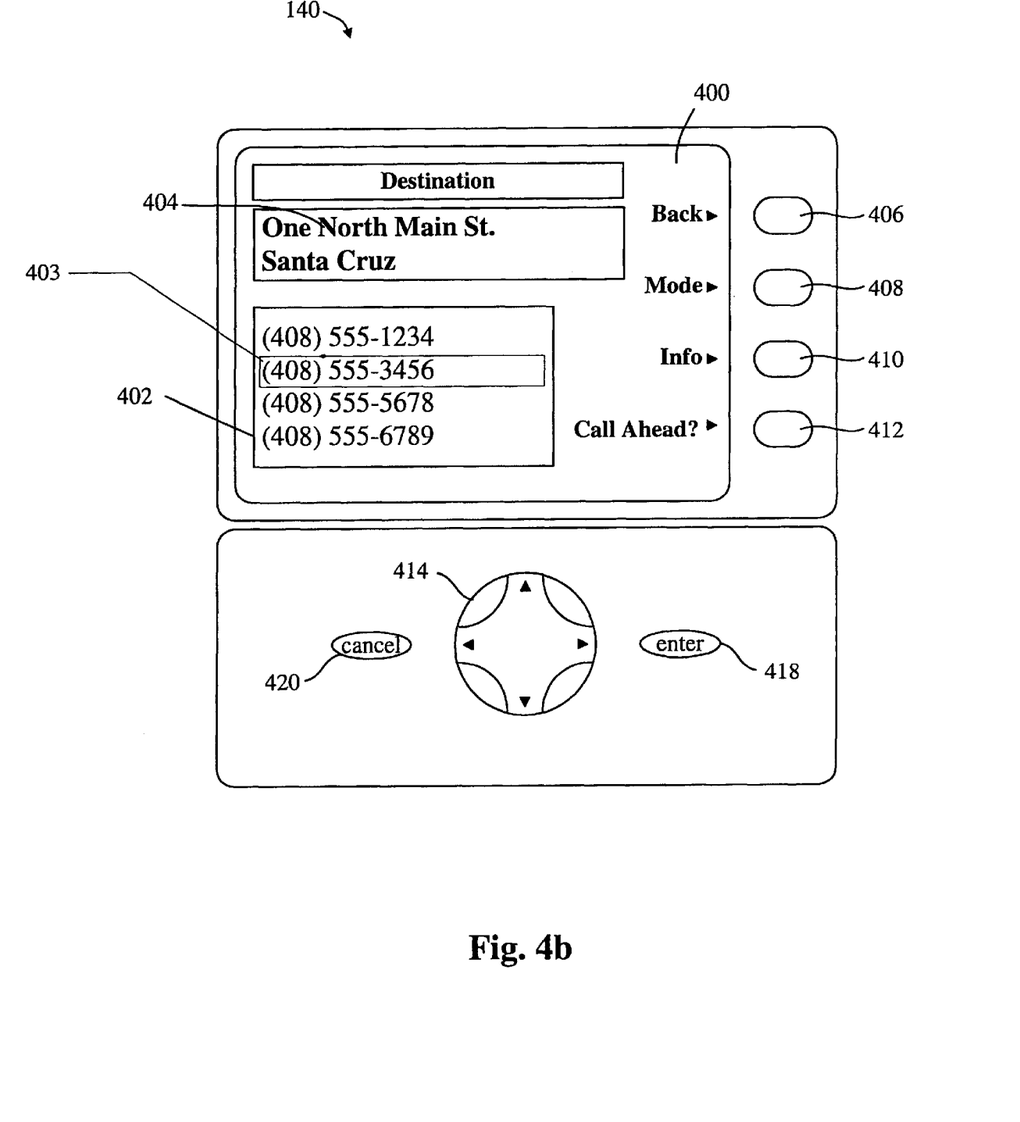
FIG. 4b illustrates a sample GUI screen with a soft key device for selecting a phone number for dialing from a list of phone numbers.

FIG. 1 is a block diagram of a specific embodiment of a vehicle navigation system 100 for use with the present invention. Sensors 112 and 114, traffic data receiver 116, and GPS receiver 118 are coupled to computing means 120 through sensor/GPS interface 122. In typical embodiments, mileage sensor 112 comprises an odometer, and angular velocity sensor 114 comprises a gyroscope, or a differential odometer coupled to the wheels of the vehicle. Traffic data receiver 116 may comprise any of a wide variety of RF receivers which are operable to receive real time traffic data transmitted in a variety of formats. A global positioning system (GPS) data receiver 118 is provided for receiving signals from, for example, a satellite-based navigation system. Data from sensor/GPS interface 122 is transmitted to CPU 124, which performs calibration, signal processing, dead-reckoning, vehicle positioning, route calculation, guidance, map drawing, telephone number retrieval and storage, and dialing functions. A database containing map information may be stored in storage medium 126, with software directing the operation of computing means 120 stored in main memory 128 for execution by CPU 124. Main memory 128 may comprise any of a wide variety of non-volatile memory such as, for example, read-only memory (ROM), reprogrammable non-volatile memory such as flash memory or SRAM, compact flash cards, CD ROM, optical disk, or PCMCIA cards. System RAM 127 permits reading and writing of the information necessary to execute such software programs. Storage medium 126 may comprise non-volatile memory, compact flash cards, a hard disk drive, CD-ROM, or an integrated circuit in which digitized map information has been stored. Output controller 132, which may comprise a graphics controller, receives data processed by CPU 124 and transmits the data to display console 140 which includes output communicator 134, usually comprising a display screen. However, the output communicator 134 may comprise a speaker or both a display screen and a speaker, and in specific embodiments may also include a microphone. In a specific embodiment, as shown in FIGS. 4a and 4b, display console 140 includes the display screen, soft keys 406–412, four-position rocker switch 414, enter key 418, and cancel key 420. The user may input data, such as a desired destination, and select the automatic phone dialing option through the use of these keys. Operation of these keys is explained in greater detail in the description of these figures. In yet another embodiment, the user input may comprise a voice input through the vehicle navigation system's microphone (not shown) which is later processed by voice recognition software in computing means 120.

The map database stored in storage medium 126 comprises positional data such as, for example, latitude and longitude coordinates, to describe road intersections or nodes, road segments, landmarks and points of interest, and other geographical information. The data base may further comprise data representing characteristics of roads or places on the map, such as road and place names, road features such as dividers, one-way restrictions, surface, speed limit, shape, elevation, and other properties. According to specific embodiments of the invention, the map database includes cost values associated with individual nodes and road segments. These cost values correspond to the estimates of time intervals for traversing the respective node or segment. Node cost values take into consideration such information as, for example, whether the vehicle would encounter oncoming traffic, thus delaying a left turn maneuver. Segment costs reflect road segment characteristics such as speed limit and segment length, both of which affect the travel time along the segment. Also associated with each road in the map database is a hierarchy value which relates to the category or type of the road. For example, the highest level category of the hierarchy includes freeways and expressways. The lowest level includes residential streets and/or alleys. The information stored in the map database in storage medium 126 is employed with the data received from interface 122 for route calculation, guidance, map drawing, and transmission of telephone numbers.

According to a specific embodiment, the storage medium may include data storage for phone numbers associated with the geographical locations or desired destinations. In another embodiment data unique to the user such as a personal address book of destination addresses or points of interest and associated phone numbers are stored in non-volatile memory 130. Non-volatile memory 130 may comprise one or more of a wide variety of non-volatile memory devices, such as flash memory or SRAM, compact flash cards, CD ROM, optical disk, or PCMCIA cards. Although a specified embodiment places the nonvolatile memory 130 within the vehicle navigation system, other embodiments may utilize the non-volatile memory contained within personal digital assistants or other forms of external, non-volatile memory.

In the present invention, phone numbers selected for dialing are processed by the CPU 124 and transmitted to wireless device interface 150. In one embodiment, the interface 150 connects to a wireless communications device 148 integrated into the vehicle navigation system. In this embodiment, the vehicle navigation system's speakers (not shown) and microphone are used for the wireless communications listening and speaking functions. In another specific embodiment, the wireless device interface connects to an external wireless communications device. This external wireless device may be a portable wireless phone, connected to the navigation system through a cradle or similar adapter. Where an external communications device 148 is used, the microphone and speakers built into the portable unit may be used for communications functions. In an alternate embodiment, the navigation system's speakers and microphone may be used for the voice communications functions even where an external wireless communications device is used. The navigation system speaker in one embodiment is also used to provide an audio message to the user notifying him of a phone number availability associated with a destination.

Figure 2:
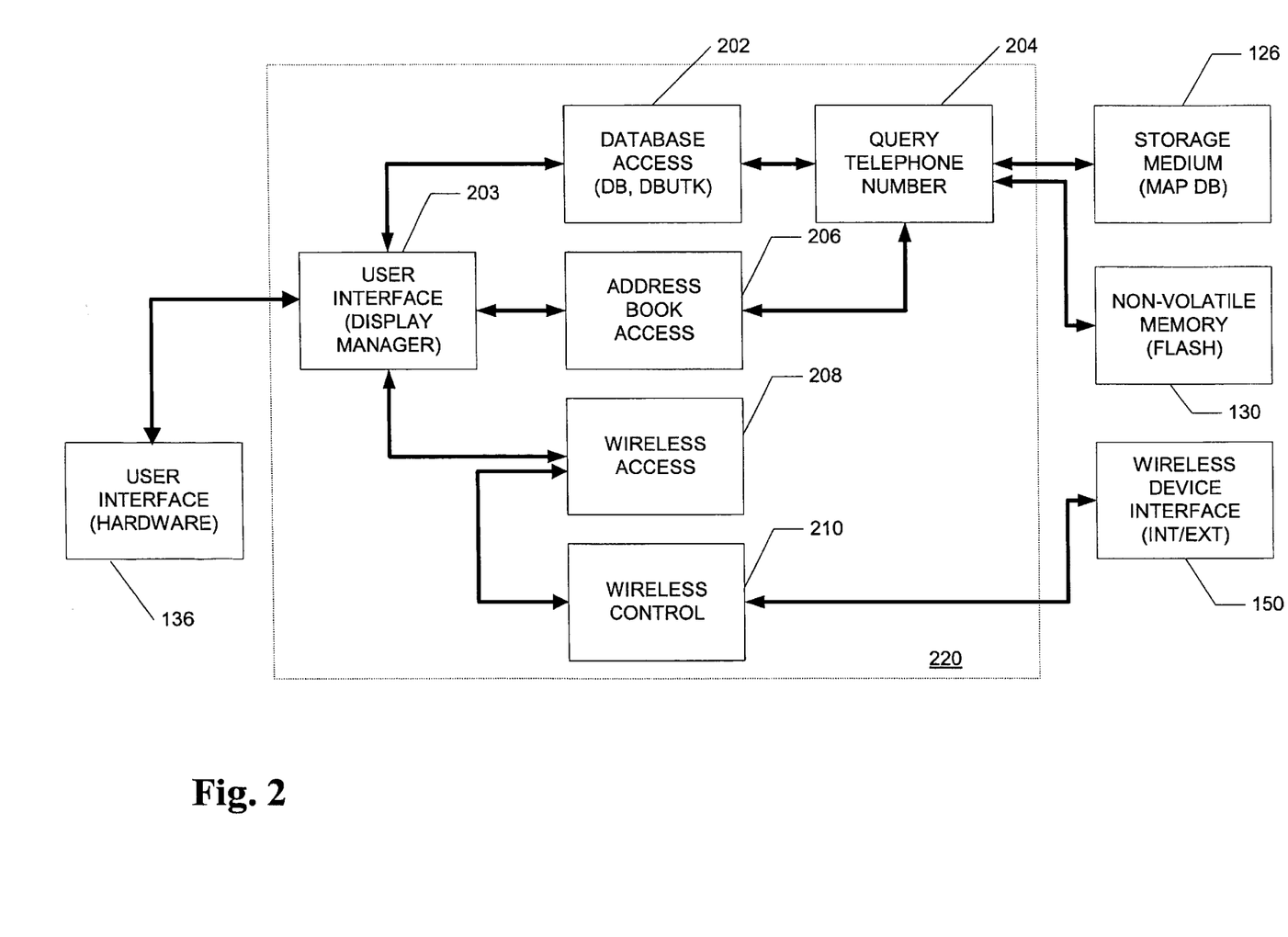
FIG. 2 is a block diagram of the software modules used to implement the retrieval, selection, and dialing functions in the present invention.
Figure 3:
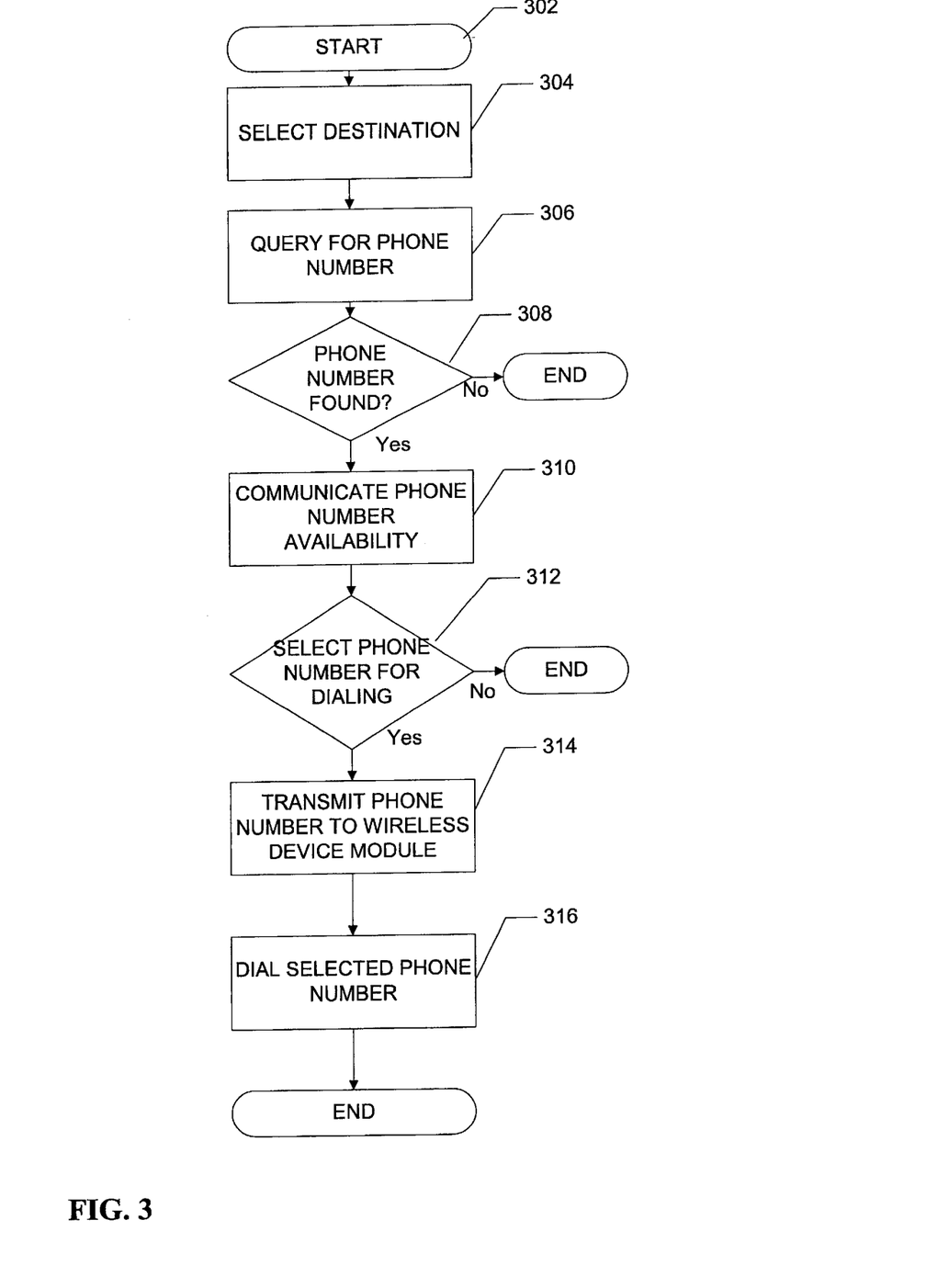
FIG. 3 is a flowchart illustrating a method of selecting a destination and dialing a phone number associated with that destination.

FIG. 2 depicts the specific software modules used in one embodiment for implementing the invention's features in a vehicle navigation system. The library of software modules 220 is implemented by the CPU 124 with the program code typically stored in ROM 128. FIG. 3 is a flowchart illustrating the process of selecting and dialing automatically a phone number associated with a location. This process takes a destination selected by the user, activates a wireless communications device 148, and dials the phone number associated with the destination.

Initially, the user selects a destination for phone number searching (304). This may be a point of interest, address, or other location selected for the primary purpose of route generation or, according to various embodiments, may be selected independently at any time during the vehicle's trip, expressly for the purpose of locating and dialing the phone number. User interface 136 can be either alone or in combination a keyboard, soft key system, touch screen, or any other human/computer interface device. FIG. 4a is an illustration of a specific embodiment of display console 140 with a "Destination" graphical user interface (GUI) screen shown along with soft keys 406–412. In a specific embodiment, this GUI screen is presented to the user after successive "Select City", "Select Street", and "Select Address" screens appear. For each such GUI screen, selection of the destination is accomplished through the use of the soft keys 406–412, four-position rocker switch 414, and enter key 418. These operations are more fully described in commonly assigned, copending U.S. patent application Ser. No. 09/131,045, entitled METHODS AND APPARATUS FOR SELECTING A DESTINATION IN A VEHICLE NAVIGATION SYSTEM, filed on Aug. 5, 1998, the entirety of which is incorporated herein by reference for all purposes. Details of the functions of all the display console keys used in selecting phone numbers or dialing a displayed phone number in the destination GUI are described in other portions of this specification.

The destination selected by the user through the interface hardware is first handled by the user interface software module 203. This module facilitates retrieval of the destination information from the appropriate memories. These memories, as shown in FIG. 2, may include the storage medium 126 and non-volatile memory 130. Storage medium 126 contains the map database whereas non-volatile memory 130 represents the personal electronic address book of the user. One embodiment contemplates search of at least one of the map database and personal address book of the user for the destination and associated phone number. Some embodiments may, however, select to search only one of these memories or may have only one such memory available for destinations. Other embodiments may search at least one of a map database, a non-volatile memory such as a personal address book, and a second non-volatile memory such as the memory contained within the wireless communications device.

Once the destination or point of interest is located, associated memory fields are searched for an available phone number (306). The query telephone number software module 204 determines if phone numbers associated with the selected destinations or points of interest are available. This module is invoked by the database access module 202 and the address book access module 206. The map database storage medium 126 is initially searched to locate the point of interest, address, or destination. Points of interest are typically businesses, restaurants, or other landmarks which are available for a specified geographical area and are often stored on CD-ROM media. The query telephone module 204 specifically determines if the appropriate data field for the subject location contains a telephone number listing (306). In an alternate embodiment, a user may have available a personal address book implemented in non-volatile memory 130 containing personal addresses and points of interest with associated telephone number fields. The address book access software module 206 can be separately activated by the user interface 203 to invoke the query telephone number module 204 to search non-volatile memory 130 for the destination and associated telephone number fields. In a specific embodiment both the database access module 202 and the address book access module 206 will be accessed when a user-selected destination is entered using interface software module 203. Wireless communications devices such as portable cellular phones commonly come equipped with memory for storage of phone numbers. In another specific embodiment, the query telephone number module 204 searches the wireless device memory by itself or in conjunction with searches of the storage medium 126 and other non-volatile memory 130 for the destination and phone number information.

Where no phone number is available associated with the chosen destination, the process ends (308), allowing the display console 140 to proceed with the GUI's involved in the map generation and routing functions. In one embodiment, where no number is found, the display console 140 shows an interim GUI 400 such as shown in FIG. 4a absent the phone number text and the "Call Ahead?" text next to key 412. If a matching telephone number field is located (308), the fact of the phone number availability is transmitted to the user (310). A message confirming existence of such a phone number in storage medium 126 or non-volatile memory 130 is communicated back to the user through interface software module 203. The phone number availability notification may come in the form of an enabled soft key option on a display device associated with vehicle navigation system. In other embodiments, communication to the user of the option for dialing the phone number may comprise an audio message communicated through the system speaker or a text message appearing on the vehicle navigation system display through display console 140.

In a specific embodiment as shown in FIG. 4a, a "Destination" GUI screen 400 communicates to the user the existence of a phone number associated with a destination and permits selection of the automatic dialing feature. In FIG. 4a, the upper window 404 designates the address or location selected by the user through the use of previously presented GUI screens 400 such as "Select City", "Select Street", and "Select Address". In one embodiment, notification that a telephone number has been successfully retrieved is accomplished by the appearance of the text "Call Ahead?" next to soft key 412. In another embodiment, the user is also notified of the successful telephone number retrieval by the existence of one or more phone numbers appearing in lower window 402.

According to various embodiments, selecting the dialing option can comprise activating a soft key or providing the appropriate voice command to be interpreted by voice recognition software (312). Another embodiment may include a touch sensitive screen for menu option selection. The call ahead key 412 enables the user to select the highlighted phone number for dialing by the system. The display console includes soft keys 406, 408, 410, and 412. The functions of these keys can vary according to the GUI screen presented. In the destination screen shown in FIGS. 4a and 4b, back key 406 enables the user to go back to the previously displayed screen, which in this example would be the select address screen. Mode key 408 enables the user to switch the active window between upper window 404 and lower window 402. When one window is activated in this manner, the other has some attribute which is visually suppressed. For example, the brightness of the text appearing in the window may be reduced. Activating the info key enables information regarding the phone number appearing in highlighted bar 403 to be displayed in the upper window. For example, this might be the name of the individual associated with the highlighted phone number. Depressing cancel switch 420 will interrupt the dialing function previously selected by depressing soft key 412. Where the user has selected the geographic location specifically for the purpose of dialing the phone number, the option of dialing the number need not be communicated. Rather, the present invention includes embodiments in which the dialing of a phone number associated with a geographic location occurs automatically in response to selection of that location.

User input may also be necessary for selecting one of several phone numbers associated with a destination. In situations where a plurality of phone numbers exists for a selected destination, the user may be prompted for further selection as shown by GUI 400 in FIG. 4b. The destination GUI screen 400 includes a window 404 with the selected destination displayed similar to the destination display for the single phone number shown in FIG. 4a. Window 402, however, displays the plurality of phone numbers associated with that destination. Such a destination with multiple associated phone numbers might be a commercial building or a shopping center among other possibilities. The up and down functions of the four-position rocker switch 414 permit the user to scroll the highlighting block 403 through the list until the desired phone number is highlighted. The up-down functions of rocker switch 414 will cause the list of phone numbers to scroll in an up or down direction in one embodiment. For example, moving rocker switch 414 in the up direction in FIG. 4b will cause the phone number immediately above the number appearing in highlight bar 403 to drop down one position so that it will then appear in the highlighted bar. The scrolling function is accomplished by causing all phone numbers in the list to drop down one position, with the lowest number dropping off of the list and a new phone number, if available, added to the top of the list. Pressing the info key 410 will cause information such as names associated with only the highlighted phone number to be displayed in upper window 404. As described with respect to FIG. 4a, depressing soft key 412 (or the enter key) selects the dialing function for the phone number highlighted by highlight bar 403.

Where no number is selected, e.g. for some programmable period of time, the process may end (312). According to various embodiments, the dialing option for the destination may be made available during the entire travel period or may be preempted, for example, by the user's entry of a new destination or pressing cancel button 420. According to various embodiments, the user may call up the dialing function at any time during operation of the system using the same processes for accessing any other system features and functions.

When the soft key or other user selection mechanism is activated (312), the phone number is transmitted from the database or address book to the wireless module (314). The wireless module, which may consist of a wireless telephone integrated into the vehicle navigation system or, in another embodiment, a separate self-contained portable wireless telephone connected to the system via interface 150, dials the selected phone number (316) thereby enabling the automatic dialing of the destination's phone number. Selection of the dialing option causes the user interface module 203 to pass the phone number data to the wireless access software module 208. When the wireless telephone is in use, inoperable, or otherwise unavailable to the user, an error code is passed back to the user interface module 203 from module 208. In one specific embodiment the user may be notified of an unsuccessful connection through a text message in display console 140.

Module 208 transmits the telephone number data to wireless control module 210 when the wireless communication device is available to the user (314). The wireless control module 210 contains hardware drivers for operating the wireless telephone and interface functions contained within wireless device interface 150 and wireless device 148. Wireless device 148 may be either a self-contained wireless phone integrated into the module or an adapter such as a cradle which can be adapted to connect one or more models of portable wireless communications devices such as cellular telephones to the vehicle navigation system. The wireless device interface 150 initiates the dialing function of the wireless communication device and, according to one embodiment, activates the navigation system's speaker and microphone to permit the telephone conversation to commence (316). Another specific embodiment will use the built-in speaker and microphone of the external wireless device 148 for telephone communications.

While the invention has been particularly shown and described with reference to specific embodiments, it will be understood by those skilled in the art that other details may be made without departing from the spirit or scope of the invention. For example, many different types of display and interface devices can be used other than those listed in the foregoing embodiments. Furthermore, certain terminology has been used to aid in the description of the embodiments but was not intended to limit the present invention. Therefore, in view of the foregoing, the scope of the invention should be determined by reference to the appended claims.

What is claimed is:

1. A computer implemented method for dialing a telephone number using a vehicle navigation system, the method comprising:

retrieving a destination in response to selection of the destination by a user;

determining if there is a phone number associated with the destination by querying an address book associated with the user; and where there is a phone number associated with the destination, transmitting the phone number to a wireless communications device for dialing.

2. The method of claim 1 further comprising, where there is a phone number associated with the destination, communicating an option for dialing the phone number to the user, transmitting the phone number to the wireless communications device occurring in response to selection of the option by the user.

3. The method of claim 1 wherein transmitting the phone number to the wireless communications device occurs automatically after the phone number associated with the destination is found.

4. A computer implemented method for dialing a telephone number using a vehicle navigation system, the method comprising:

retrieving a destination in response to selection of the destination by a user wherein the destination is stored in an address book associated with the user determining if there is a phone number associated with the destination in the address book; and where there is a phone number associated with the destination, transmitting the phone number to a wireless communications device for dialing.

5. The method of claim 1 wherein the destination is selected by the user for generation of a route to the destination.

6. The method of claim 1 wherein the destination is selected by the user for dialing the phone number.

7. The method of claim 1 wherein the destination comprises a point of interest.

8. The method of claim 1 wherein the destination comprises an address.

9. The method of claim 1 further comprising, where there is a plurality of phone numbers associated with the destination, communicating a second option to the user for selecting the phone number from the plurality of phone numbers.

10. The method of claim 1 wherein communicating an option for dialing the phone number comprises providing a soft key option on a display device associated with the vehicle navigation system.

11. The method of claim 1 wherein communicating an option for dialing the phone number comprises presenting a message to the user using an output communicator.

12. The method of claim 11 wherein presenting the message comprises playing an audio message on a speaker associated with the vehicle navigation system.

13. The method of claim 11 wherein presenting the message comprises displaying a text message on a display associated with the vehicle navigation system.

14. The method of claim 1 wherein transmitting the phone number occurs in response to activation of a soft key.

15. The method of claim 1 wherein transmitting the phone number occurs in response to a voice command.

16. The method of claim 1 wherein the wireless communications device is integral to the vehicle navigation system.

17. The method of claim 1 wherein the wireless communications device is separate from the vehicle navigation system.

18. A computer readable medium comprising computer program instructions for causing a computer to perform the method of claim 1.

19. An apparatus for dialing a telephone number comprising:
- means for retrieving a destination in response to selection of the destination by a user;
- means for determining if there is a phone number associated with the destination by querying an address book associated with the user; and
- means for transmitting the phone number to a wireless communications device for dialing where there is a phone number associated with the destination.

20. A vehicle navigation system comprising:
- a plurality of sensors for generating positional data;
- a memory for storing a map database;
- a wireless device interface for connecting to a wireless communications device; and
- a central processing unit configured to:
  - retrieve a destination in response to selection of the destination by a user;
  - determine if there is a phone number associated with the destination by querying an address book associated with the user;
  - transmit the phone number via the wireless device interface to the wireless communications device for dialing where there is a phone number associated with the destination.

21. The system of claim 20 wherein the central processing unit is further configured to communicate an option for dialing the phone number to the user and transmits the phone number to the wireless communications device in response to selection of the option by the user.

22. The system of claim 20 wherein the central processing unit automatically transmits the phone number via the wireless device interface to the wireless communications device for dialing after the phone number associated with the destination is found.

23. The system of claim 20 wherein the wireless communications device is integral to the vehicle navigation system.

24. The system of claim 20 wherein the wireless communications device is separate from the vehicle navigation system.

25. The method of claim 1 wherein the address book is located within a personal digital assistant.

26. The method of claim 1 wherein the address book comprises non-volatile memory in the form of one of flash memory, SRAM, compact flash cards, and CD-ROM memory.

* * * * *